United States Patent [19]
Luthier et al.

[11] Patent Number: 5,233,257
[45] Date of Patent: Aug. 3, 1993

[54] PIEZO-ELECTRIC MOTOR

[75] Inventors: Roland Luthier, St-Sulpice, Switzerland; Minoru Kurosawa, Yokohama, Japan

[73] Assignee: Asulab, SA, Switzerland

[21] Appl. No.: 759,561

[22] Filed: Sep. 13, 1991

[30] Foreign Application Priority Data

Aug. 30, 1991 [CH] Switzerland .......................... 2553/91

[51] Int. Cl.$^5$ ............................................. H01L 41/08
[52] U.S. Cl. ..................................... 310/323; 310/328
[58] Field of Search ................................ 310/323, 328

[56] References Cited

U.S. PATENT DOCUMENTS

| | | | |
|---|---|---|---|
| 4,019,073 | 4/1977 | Vishnevsky et al. | 310/323 |
| 4,692,650 | 9/1987 | Okumura et al. | 310/323 |
| 4,871,937 | 10/1989 | Kawai | 310/323 |
| 4,884,002 | 11/1989 | Eusemann et al. | 310/323 |
| 5,039,899 | 8/1991 | Yamaguchi | 310/323 |

FOREIGN PATENT DOCUMENTS 0325062 7/1989 European Pat. Off. .
0395298 10/1990 European Pat. Off. .

Primary Examiner—Mark O. Budd
Assistant Examiner—Thomas M. Dougherty
Attorney, Agent, or Firm—Pollock, Vande Sande & Priddy

[57] ABSTRACT

The instant invention relates to a piezo-electric motor. The motor comprises:
- a support (2)
- a stator (8) integral with the support (2)
- a rotor (30) rotatably mounted with respect to the support, the rotor being capable of being displaced in a displacement plane (Pdm) about a geometric axis of rotation (XI)
- transmission means (36) to transmit the vibratory movement of the stator (8) to the rotor (30) and to rotate it and
- means to support (40) the rotor on the stator the rotor being characterized in that the stator (8) has vibratory movement having velocity components essentially normal to the displacement plane (Pdm) of the rotor (30), the stator (8) cooperating with means for converting the vibratory movement of the stator in order to rotate the rotor.

16 Claims, 6 Drawing Sheets

PIEZO-ELECTRIC MOTOR

TECHNICAL FIELD

The instant invention relates to a piezo-electric motor.

A piezo-electric motor of the travelling wave type is already known from the document EP No. 0 325 062 which has a base forming support means, from which a support shaft extends perpendicularly and on which a stator is mounted.

A piezo-electric transducer is mounted below the stator and comprises for example a ceramic which may be electrically energized in order to impart vibratory movements of the travelling wave type to the stator.

This piezo-electric motor comprises, in addition, a rotor which is maintained in axial contact on the stator by means of fixing means. The transmission means for the vibratory movement supplied by the stator are disposed on the rotor, the said transmission means being constituted by protuberances in the form of segments of a circle.

A motor of equivalent construction is described in the document EP No. 0 395 298. However even though this motor has a construction similar to the motor described above it operates with a different vibratory mode termed standing waves. It also has means for transmitting the movement comprising protuberances formed as areas of increased thickness directly on the stator.

These motors have the advantage of being able to provide a considerable couple at low rotation speeds.

However, in applications such as robotics, biomedical engineering and also aeronautics, attempts are being made to miniaturize motors to the extreme, which leads inevitably to a substantial diminution of all their dimensions. Moreover the diminution of the output range in an intrinsic and necessary manner, from the very high rotation speeds, requires the setting up of reduction gearing which considerably increases the complexity of systems including the motors and which increases their costs.

Document U.S. Pat. No. 4,453,103 also describes a piezo-electric motor of the co-axial structure type in which the stator is of tubular form surrounding the rotor which comprises a piezo-electric transducer supplying its vibratory movement to the pusher members formed by deflectable resiliently deformable members. The pusher members press periodically against the stator to impart a rotary movement to the rotor.

This type of motor has the main disadvantage of having a very complex structure. Furthermore it does not comprise adjustment means for the mechanical connection between the rotor and the stator, which does not permit any adjustment at the end of the production line. In this way, the structural complexity of the motor and the absence of adjustment means on it, requires that it has to be machined to very exact tolerances which increases the price.

It is thus an object of the present invention to overcome the above mentioned disadvantages and to provide a piezo-electric motor capable of being miniaturized, which is capable of delivering a significant motor couple and which has a simple construction so that it can be manufactured at low cost.

It is thus an object of the present invention to provide a piezo-electric motor of the type having:

a support,
a stator integral with said support,
piezo-electric means capable of being electrically energized in order to impart vibratory movement to the stator,
a rotor rotatably mounted with respect to the support, said rotor being capable of being displaced in a plane designated the displacement plane about a geometric axis of rotation,
transmission means adapted to transmit the vibratory movement of the stator to the rotor and to displace the rotor in rotation about said axis, and
means to support the rotor on the stator characterized in that the stator has vibratory movement having velocity components essentially normal to the displacement plane of the rotor, cooperating with means for transforming the vibratory movement of the stator in order to rotate the stator.

It can also be noted that the stator undergoes an axisymmetric vibratory movement especially by deflection, thereby forming components of the perpendicular speed, this axisymmetric vibratory movement being centered on the axis of rotation of the rotor.

BRIEF DESCRIPTION OF THE DRAWINGS

Other characteristics and advantages of the invention will be apparent from the teachings of the specification set out in detail as follows, with reference to the appended drawings which are given solely by way of example and in which.

DETAILED DESCRIPTION

Figure 1:
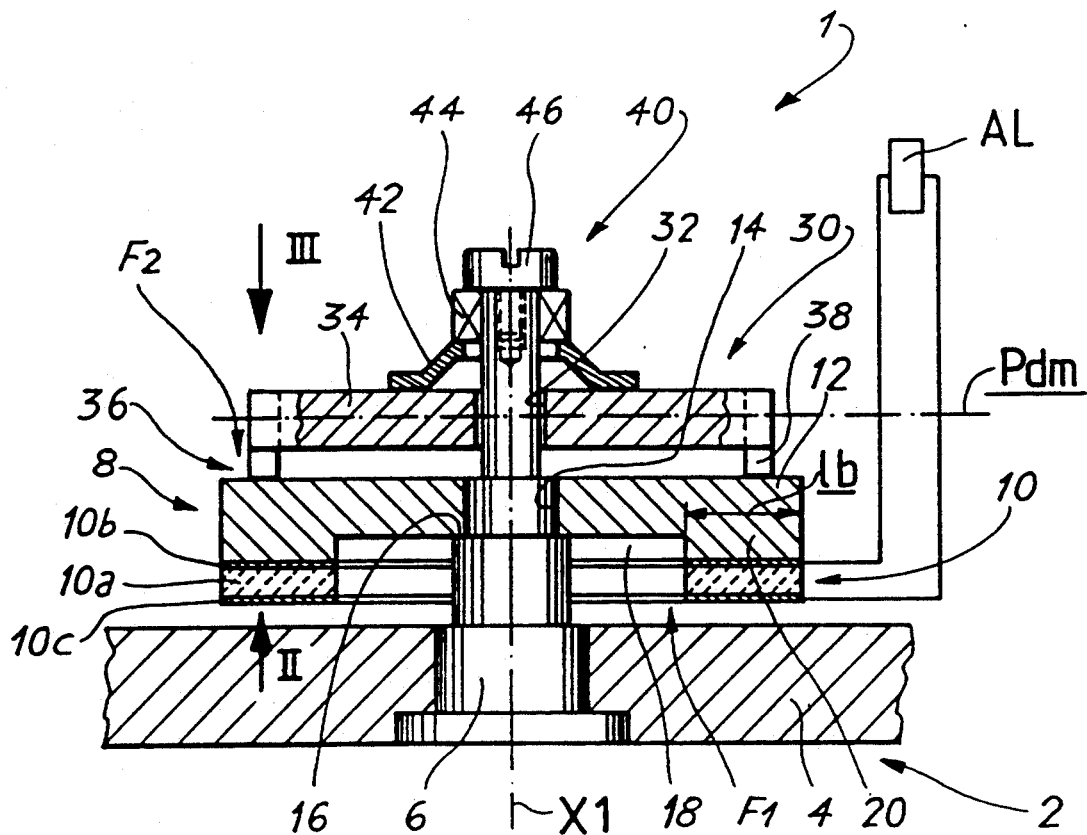
FIG. 1 is a longitudinal sectional view of a piezoelectric motor according to the invention.

Referring to FIG. 1 there is depicted therein an embodiment of a piezo-electric motor according to the invention, the motor being indicated generally by the reference numeral 1.

The motor 1 has a support 2 which in this embodiment is formed by a flange 4, in which is embedded and firmly fixed, especially by fitting by force by pressing or by adhering, a stepped pin or stud 6. The stepped pin 6 extends from the support 4 extending vertically therefrom (in the position shown in FIG. 1) and in a perpendicular manner therefrom.

The stepped pin 6 which has the external form of a cylinder has a geometrical axis XI, which will hereinafter be termed the geometrical axis of rotation. The base 4 as well as the stepped pin 6 are formed out of a metallic material such as brass or an alloy of the stainless steel type.

The assembly support 4 - pin 6 thus constitutes a fixed structure forming the support 2 for the piezo-electric motor 1 according to the invention.

A stator 8 is securely mounted on the stepped pin 6, either by a forced press fit or by bonding.

On the stator 8 which is thus integral with the support 2 due to the stepped pin 6, there are mounted piezo-electric means 10 made up of a piezo-electric element 10a, such as a ceramic, polarised uniformly throughout its thickness and of two electrodes 10b and 10c which are connected in a conventional manner, and an electrical supply AL shown here in schematic manner.

The piezo-electric means 10 thus former a transducer, which in response to an electrical excitation provided by the supply AL via the electrodes 10b and 10c, can undergo a vibratory movement. The phenomenon of piezo-electricity, as well as the construction and arrangement of such piezoelectric transducers in motors of this type, are well known to the man skilled in the art and as a result are not described in detail here.

In the motor, the stator is made up of a disk 12 comprising at its center an orifice opening 14 which, in this example, is press fitted by force or directly bonded on the exterior cylindrical circumference of the stepped pin 6. The disc 12, which forms the framework of the stator 8, rests on an axial support provided by a shoulder 16 of the stepped pin 6.

As may in particular be seen in FIG. 1, a surface F1 of the disk 12, disposed facing the base 4 and termed the back surface, is hollowed out in its central part in order to form a blind hollow or chamber 18 facing towards the base 4.

This hollow 18 permits the delimitation, on the back face F1 of the disk forming the stator, of an annular collar 20 on which are securely mounted the piezo-electric means 10.

The piezo-electric means 10 also have the form of an annular disk whose width 1a (FIG. 2) is the same as width 1b (FIG. 1) of the annular ring 20.

Figure 2:
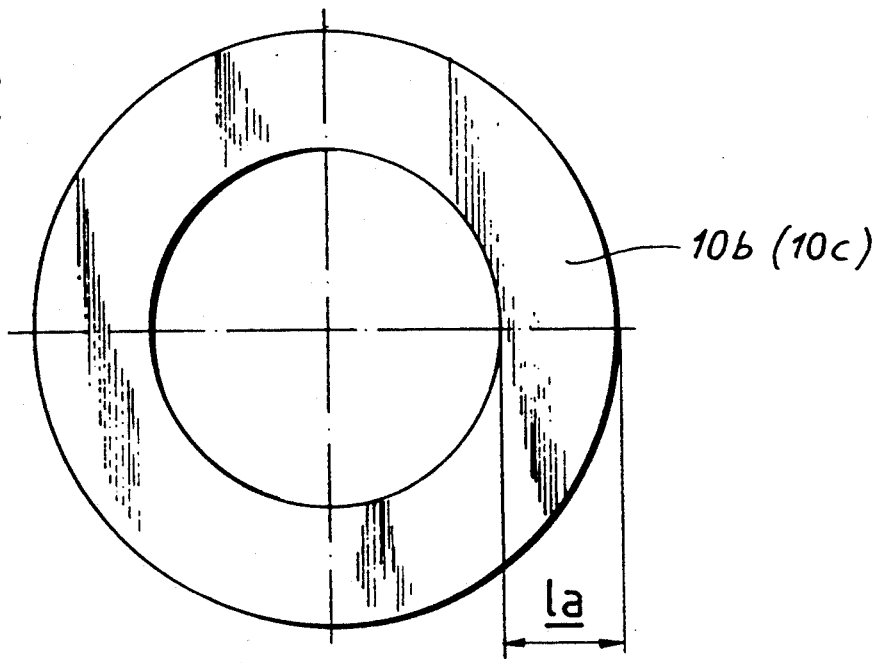
FIG. 2 is a plan view of an electrode of the stator of FIG. 3 is a view in the direction of the arrow III of FIG. 1, showing the upper surface, according to a first embodiment of the invention, of a rotor intended for use in a motor according to the invention.

It should be noted that in a very advantageous manner the electrodes 10b and 10c of the piezo-electric means 10 also have the form of an annular disk of slight thickness and showing in front projection, as may be seen in FIG. 2, a planar and unbroken structure, i.e. not cut out and not structured by polarized segments as is the case in conventional structures.

The electrodes 10b, and 10c which are identical are thus extremely simple in design and manufacture.

One may point out here that the disk 12 forming the stator 8 is preferably made of a metallic material such as brass, an alloy of stainless steel or of aluminium, optionally covered with a thin layer of a hard material, especially chromium or titanium nitride. The electrodes 10b and 10c are preferably made of nickel or silver.

The piezo-electric motor 1 also comprises a rotor 30 mounted rotatably with respect to the support 2 about the geometrical axis of rotation X1.

More particularly, the rotor 30 rests in axial support against one face F2 of the disk 12, opposite to the face F1, whereas it engages freely by a central orifice 32 with a part of the external circumference of the stepped pin 6.

The rotor 30 comprises in this embodiment a thin disk 34 made out of a material such as metal, ceramic or hard plastic. This disk 34 forms a rigid and load bearing structure capable of meshing with coupling means (not shown).

The piezo-electric motor 1, also comprises means 36 for the transmission of movement, means 36 being adapted to transmit to the rotor 30 the vibratory movement of the stator 8 and to move the rotor 30 in rotation about its axis X1. It should be noted that the rotor is thus suitable to move in rotation in a middle displacement plane Pdm perpendicular to the axis of rotation X1.

Figure 3:
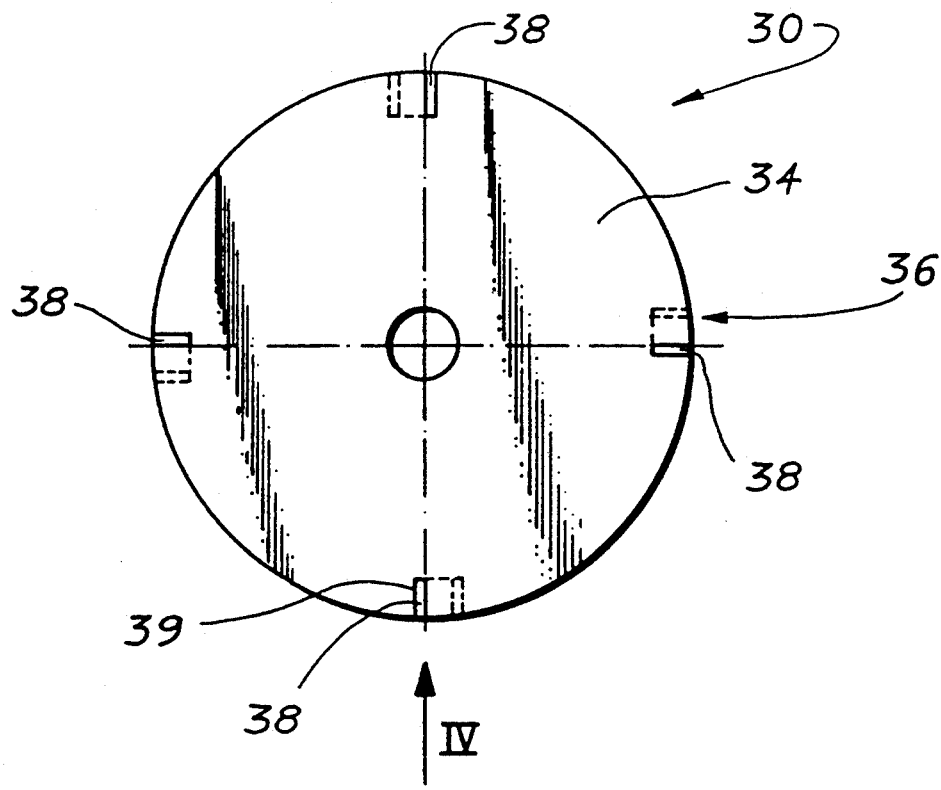
Figure 4:
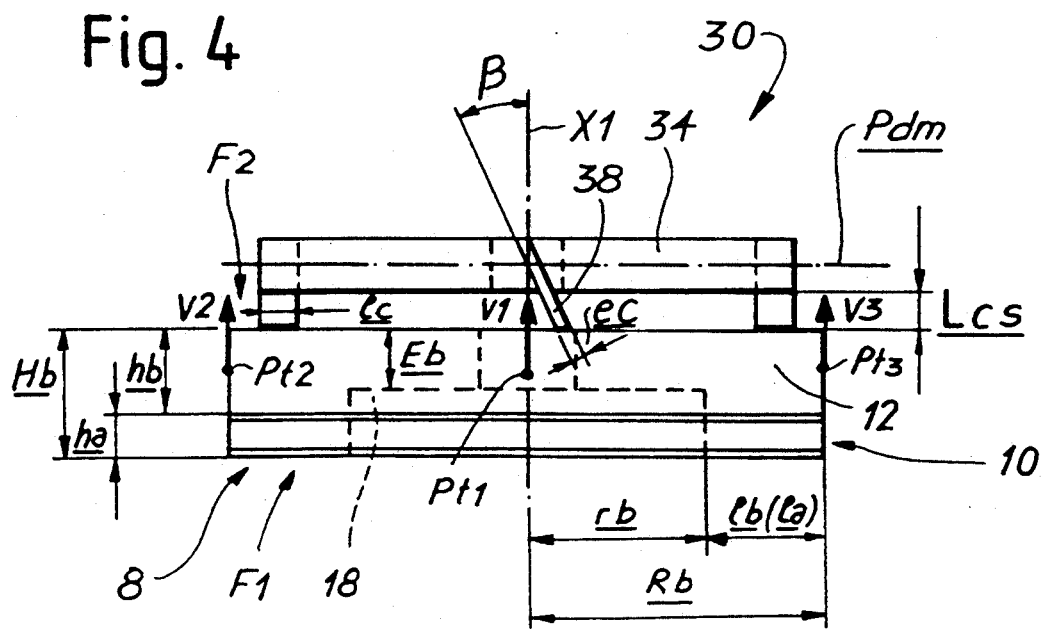
FIG. 4 is a side view showing only the rotor and stator shown in FIG. 1.

The transmission means 36 is formed by resiliently deformable members 36 made up of deflectable tongues 38. The deflectable tongues 38, as can more easily be seen in FIGS. 3 and 4, are in this example embedded in the disk 34 forming the load bearing structure of the rotor 30. The resiliently deformable members which are made up of the deflectable tongues 38 are thus securely fixed to the rotor.

The characteristics of these deflectable tongues will be hereinafter described in more detail.

Still referring to FIG. 1, it should be noted that the rotor 30 is urged in the direction axially towards the stator 8 by the intermediary of the securing means 40. The securing means 40, which permits the axial securing of the rotor 30 on the stator 8 is made up of a spring in the form of a cap 42 mounted on the stepped pin 6 and held under axial pressure by a roller bearing 44, which is itself situated on the stepped pin 6 and which is maintained on the latter by a screw 46 mounted on the free end of the said pin 6. This securing means allows for adjustment of the securing pressure of the rotor 30 on stator 8 by screwing or unscrewing the screw 46.

Referring hereinafter to FIGS. 3 and 4, the rotor 30 of the invention will now be described in more detail and notably the arrangement thereon of the resiliently deformable members of transmission means 36.

As may be seen from the Figures, the resilient members are formed by deflectable tongues 38 fixed in the periphery of the disk 34. In the figures, only four of these tongues are shown, but it will be well understood that at least three tongues must be arranged on the rotor 30. A much larger number of tongues may be employed, the limiting number being given by the maximum congestion conditions. The deformable tongues 38 are set in and securely held by bonding in the inclined grooves 39 arranged around the periphery of the disk 34.

The deflectable tongues 38 thus form projections from the rotor 30, and especially of the disk 34, in the direction of the front face F2 of the stator 8 at an angle of inclination $\beta$ having as its origin a vertical axis parallel to the axis of rotation X1. The angle $\beta$ is preferably between 10° and 30°.

In addition each deflectable tongue 38, which has a planar form of the parallelipiped type, extends from the rotor 30 along a free length Lcs which is preferably chosen from values between 0.3 and 0.7 mm (0.3 and $0.7 \times 10^{-3}$ meters). Each tongue preferably has a thickness ec having a value between 0.06 and 0.15 mm (0.06 and $0.15 \times 10^{-3}$ meters). and a width $1c$ having a value situated between 0.2 and 1 mm (0.2 and $1 \times 10^{-3}$ meters). It should be noted that the deformable tongues 38, which are interposed between rotor 30 and the stator 8, abut against and rest directly on the back planar surface of the stator 8, the back surface F2 being smooth and free from any projecting or protruding elements.

The deflectable tongues 38 are made of a material such as an alloy of the beryllium-copper type or the stainless steel type.

Figure 5:
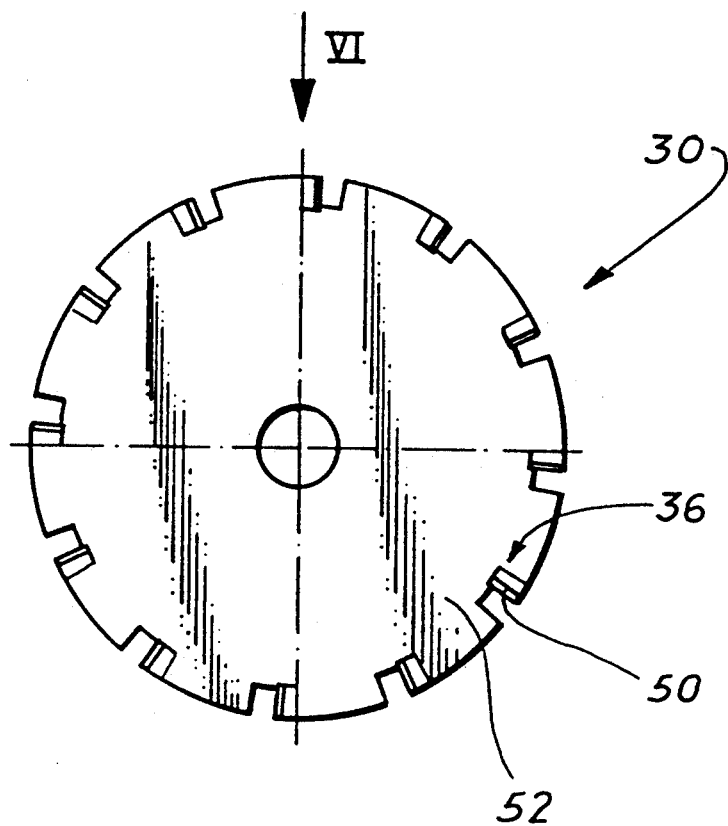
FIG. 5 is a view along the arrow V of FIG. 6 showing the upper surface, according to a second embodiment of the invention, of a rotor intended for use in a motor according to the invention.
Figure 6:
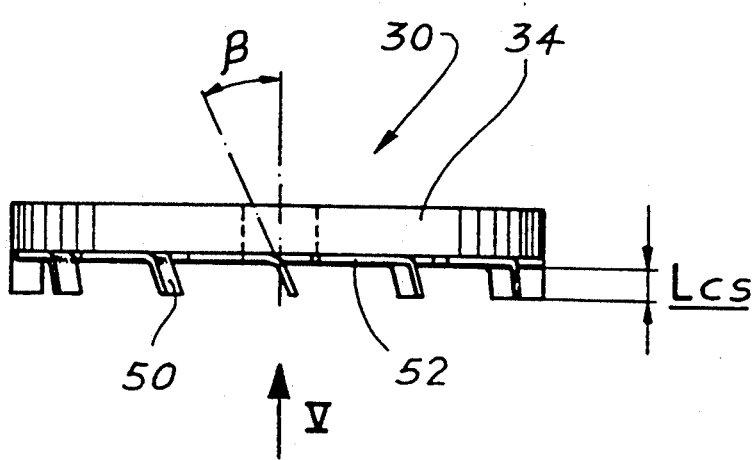
FIG. 6 is a side view of the rotor of FIG. 5 made along the arrow VI of FIG. 5.

FIGS. 5 and 6 show a second embodiment of the resiliently deflectable members of the invention.

In this embodiment, the resiliently deformable members of transmission means 36 are formed by deflectable tongues 50 bent back (of which only some are numbered) and arranged on a disk 52 of the same material. It should be noted that the disk 52 is mounted below the disc 34 forming the rotor 30. In this embodiment the deflectable tongues 50 are arranged around the periphery of the disk 52 by a cold deformation operation and especially by stamping. It is thus understood that in this embodiment, the deflectable tongues 50 constituting in particular the transmission means for the vibratory movement supplied by the stator to the rotor are obtain by operations which can be carried out at high speed.

Figure 7:
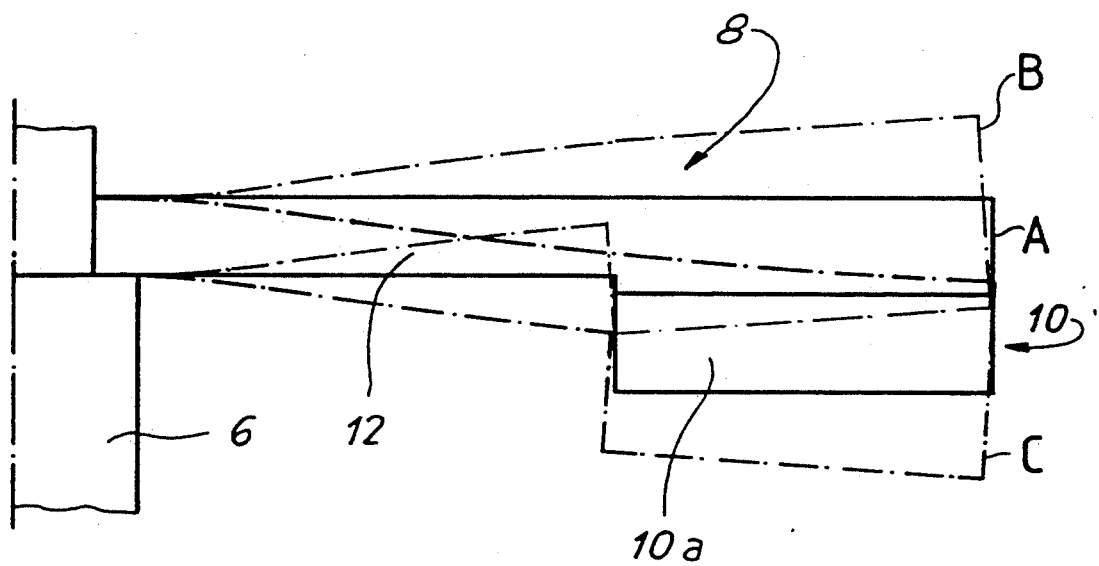
FIG. 7 is a partial view in section of the stator of FIGS. 1 and 4, showing in solid lines the rest position and in broken lines the two extreme deformed positions when the stator is in its excited vibratory state, according to a first variation of the vibratory movement according to the invention.
Figure 8:
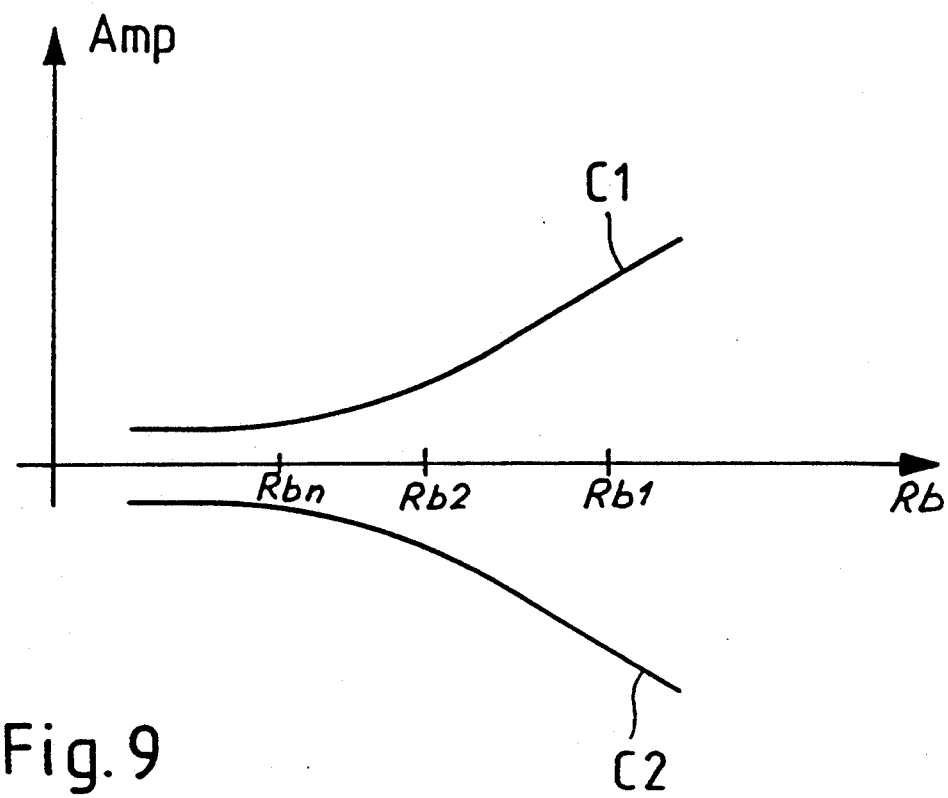
FIGS. 8 and 9 are diagrams showing the curves of variation in amplitude of the deformation of the stator as a function of the range of the stator in an angular position shown on the latter.
Figure 9:
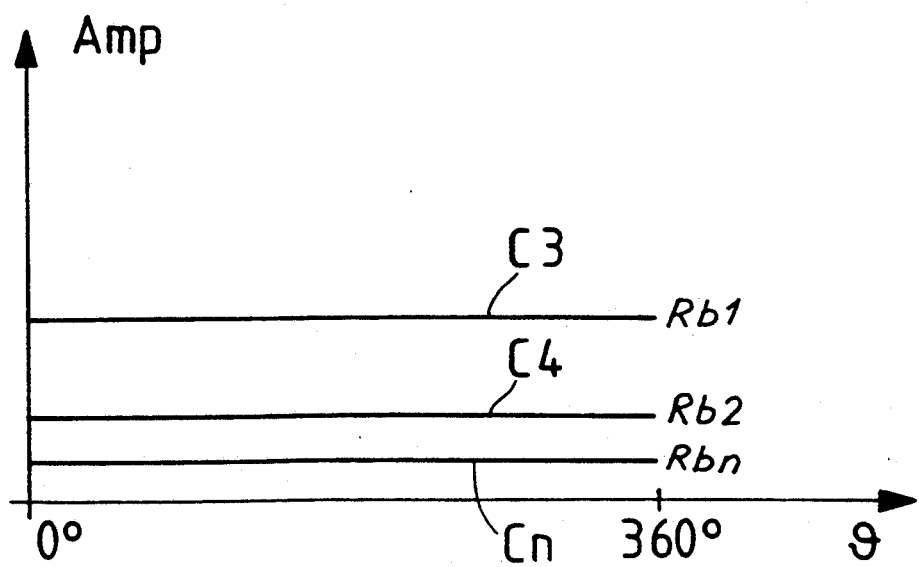

Referring hereafter to FIGS. 7 through 9, there is described a first variant of the vibratory movement of the stator according to the invention.

As shown clearly in the partial view of the stator 8 shown in FIG. 7, the stator 8 shows a deformation by deflection from one side to the other of its rest position indicated by the reference A. The deformation is represented in a greatly exaggerated manner by the positions at the upper and lower extremities B and C, and in reality does not exceed a vibration amplitude greater than 5 $\mu$m ($5 \times 10^{-6}$ meters) at the periphery of the stator (arrow). This deformation gives the stator 8 the form of a cup. This cup deformation is due to the deformation constraints generated in the stator 8 thanks to the vibratory movement induced by the piezo-electric means 10.

This vibratory movement is of the axisymmetric type and gives a deformation of the same type to the stator. This is corroborated by the curves C1 and C2 in FIG. 8 where one notes that the amplitude variation Amp of the stator 8 as a function of the radius Rb is of the same sign, that is to say increasing from the center towards the periphery of the stator 8.

It should be noted that the curves C1 and C2 do not show any inflection point or any passage through a zero amplitude value. This vibratory mode does not allow any nodal circle to appear on the stator 8. This characteristic is confirmed by the curves C3 to Cn in FIG. 9, which all show amplitude values other than 0 (zero). These curves C3 to Cn represent the variations in amplitude of the stator as a function of the angular positions thereof, these variations being taken as a positive amplitude variation corresponding to the curve Cl of FIG. 8. Furthermore it may be noted that the curves are straight and all parallel to each other which shows that the vibratory mode does not induce any nodal diameter. The vibration is thus one according to the international norm $B_{nm}$ (n being the number of nodal circles and m being the number of nodal diameters) of the type $B_{oo}$.

One can also specify that this vibratory movement and this asymmetric deformation are centered on the axis of rotation X1. A plane tiered motor is thus provided, i.e. one having a stator and a rotor having essentially planar form and superimposed. This motor, thanks to the asymmetric movements centered on the axis of rotation and oriented thereon, is of the type having an essentially axial vibratory movement, with reference to the axis X1.

Due to the modes of vibration and the axisymmetric deformation, which is of very low amplitude, each point for example Pt1 to Pt3 (FIG. 4) of the stator 8 describes more or less along the axis X1 an essentially linear displacement, in a direction parallel to the axis of rotation X1 of the same amplitude for each circle inscribed on the rotor at the level of a given radius (for example Rbl to Rbn) and in phase.

At each point on the stator and especially in the region of contact between the stator and the rotor, the axisymmetric vibration mode of the piezo-electric motor according to the invention furnishes the velocity component V (only V1 to V3 being shown in FIG. 4) essentially perpendicular to the displacement plane Pdm of the rotor 30. The stator does not have any significant velocity component in the displacement plane Pdm taking into account the very small nature of the amplitude of the vibrations. There is thus no significant acceleration of the radial, centrifugal or centripetal type. It is also noteworthy that the stator does not present any tangential acceleration, an acceleration which is on the contrary to be found in the stator of the conventional piezo-electric motors having a vibratory mode with travelling or stationary waves.

Figure 10:
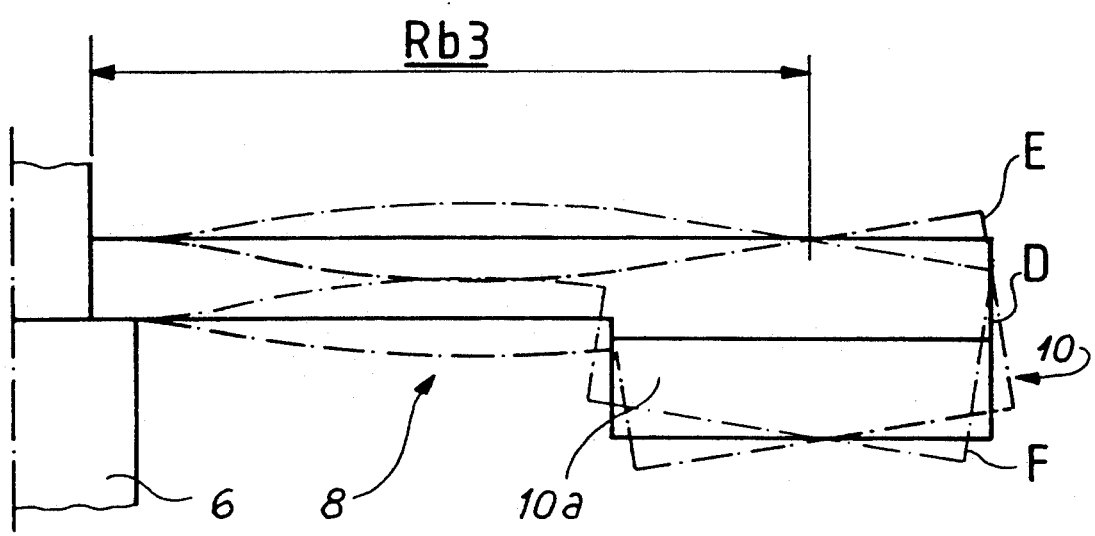
FIG. 10 is a partial sectional view similar to FIG. 7 showing a second variation of the vibratory movement according to the invention; and, FIGS. 11 and 12 show respectively views similar to those of FIGS. 8 and 9 but representing curves of the variation in amplitude of the stator when it is vibrated according to the variation of the vibratory mode of FIG. 10.
Figure 11:
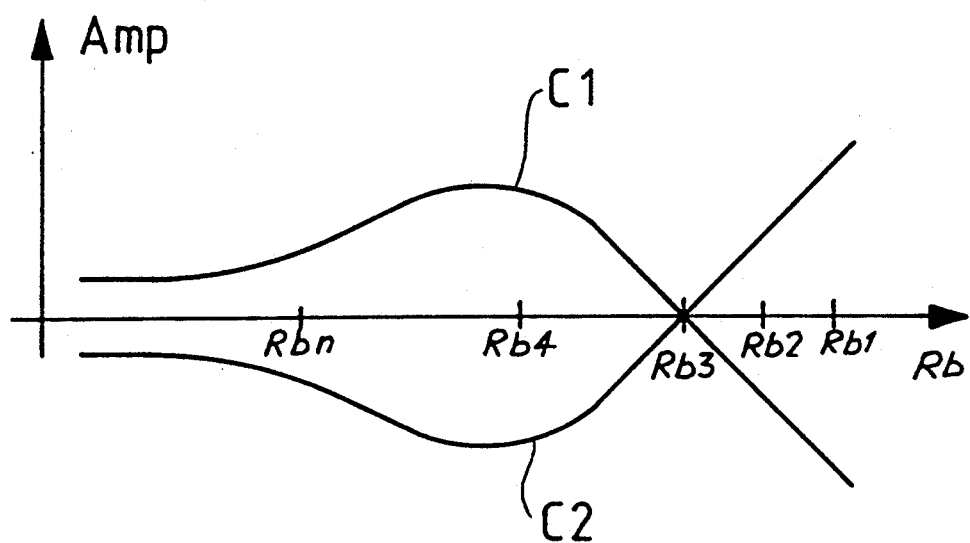
Figure 12:
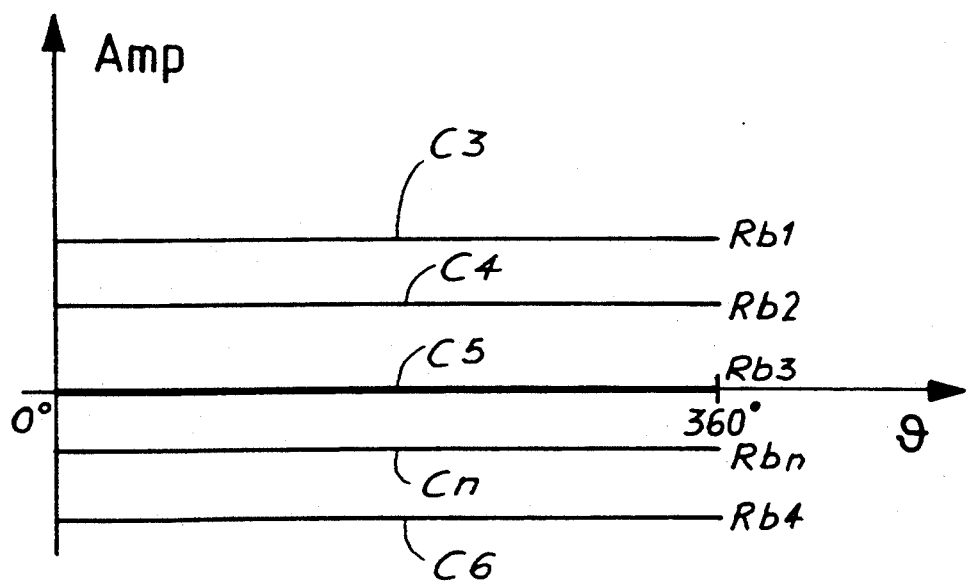

FIG. 10 shows the deformation of the stator 8 when it is subjected to a second variation of axisymmetric vibratory movement according to the invention, the reference D representing the rest position, whereas the references E and F show aspects of the stator at the extreme positions of its deformation when it is excited. In this case, the movement has a nodal circle, marked especially by the range Rb3 (FIGS. 11 and 12). The effect of the curves C1 and C2 in FIG. 11, which pass through an amplitude of zero value marking a vibrational node in the stator, should in particular be noted. The curves C3 to Cn of FIG. 12 illustrate the axisymmetric character of the vibratory mode and the deformation of the stator 8 by showing that for a given range Rbx of the stator, all circles on the latter give over 360° a constant angle of amplitude (direction of the arrow), the curves C3 to Cn of FIG. 12 being straight and parallel to each other. The curves C3 to Cn represent the amplitude variations of the stator as a function of the angular positions of the latter, these variations being given for an amplitude variation corresponding to the curve C2 of FIG. 11. This mode of vibration does not induce any nodal diameter on the stator 8. The mode of vibration is thus of the type $B_{10}$.

In order to obtain these axisymmetric vibratory modes of the $B_{oo}$ and $B_{10}$ type have been given the size where, by way of example, the stator and the piezo-electric means as follows with reference to FIG. 4; an alternating current of frequency F has been generated by means of the electrical supply AL, the sizes and frequencies for each of the modes having the following values:

|  | Mode $B_{00}$ in mm ($10^{-3}$m) | Mode $B_{10}$ in mm ($10^{-3}$m) |
| --- | --- | --- |
| Hb | 1 | 1 |
| hb | 0.5 | 0.5 |
| Rb | 5 | 5 |

-continued

|    | Mode $B_{00}$ in mm ($10^{-3}$m) | Mode $B_{10}$ in mm ($10^{-3}$m) |
| --- | --- | --- |
| rb | 3 | 3 |
| lb | 2 | 2 |
| Eb | 0.4 | 0.4 |
| ha | 0.5 | 0.5 |
| la | 2 | 2 |
| F | in KHz ($10^3$ hertz) 14 | in KHz ($10^3$ hertz) 84 | where Hb is the total height of the stator (disk 12 plus piezo-electric means 10), hb is the height of the disk 12 (that is to say the height of the stator without the piezo-electric means 10) Rb is the greater radius of the stator (taken from the periphery of the disk 12), rb is the lesser radius of the stator (that is to say the radius on which the hollow 18 is arranged,) lb is the width of the annular collar 20, Eb is the thickness of the stator (of the disk 12) at the level of the hollow 18, ha is the total height of the piezoelectric means (the thickness of the electrodes being negligible), la is the width of the piezo-electric means 10, and F is the frequency of vibration of the stator, the stator being securely fixed on the stepped pin 6 at a radius thereof having a value of 0.5 mm ($0.5 \times 10^{-3}$ meters), which is also the value of the radius of the orifice 14. The disk 12 is in this case made of a stainless steel alloy, whereas the piezo-electric element 10 is made of a ceramic piezo-electric of the Pzt type (lead titanium doped with zirconium). From the two variations of the axisymmetric vibratory modes which have been described here ($B_{oo}$ and $B_{10}$), it will be understood that the vibratory mode of the motor according to the invention may be generalized with a notation of the type $B_{xo}$ where the x may vary between 0 and an integer n.

In operation, the piezo-electric means 10 is excited by the electrical supply AL, which causes it to vibrate. This vibration is transmitted by direct planar contact to the disk 12. The stator 8 as a whole then undergoes anaxisymmetric vibratory movement as described above, that is to say $B_{oo}$ or $B_{10}$ but generally speaking $B_{xo}$.

The deformation by deflection of the stator and thus the substantially linear displacement of each individual point of the stator (especially by projection on the axis of rotating X1) due to the deflection obtained, are converted by a displacement and concomitant rotation of the rotor 30 in the plane of displacement Pdm due to the resiliently deformable members formed by the deflectable tongues 38 or 50. The tongues on being urged, bend and, induce, in the rotor 30 tangential velocity components along the peripheral of the rotor, parallel to the plane of displacement Pdm of the rotor and situated in the latter.

The resiliently deformable members formed by the deflectable tongues 38 and 50 thus form the means 36 of transformation of movement capable of transmitting and at the same time of transforming the essentially axial linear (or perpendicular) movement of the stator into a perpendicular rotatory movement of the rotor.

What is claimed is:

1. A piezo-electric motor comprising:
   a support,
   a stator fixedly secured to the support,
   piezo-electric means capable of being electrically energized to impart vibratory movement to the stator,
   a rotor rotatably mounted with respect to the support, the rotor being capable of being displaced in a displacement plane about a geometric axis of rotation,
   transmission means for transmitting the vibratory movement of the stator to the rotor to displace the rotor in rotation about said axis of rotation, and
   means to support the rotor on the stator,
   said piezo-electric means when energized providing the stator with an axisymmetric vibratory movement having velocity components substantially normal to the displacement plane such that the stator is deformed by a deflection giving it substantially the form of a cup and each point of the stator has no significant velocity component in or parallel to the displacement plane, and said transmission means comprising resiliently deformable members interposed between the rotor and the stator for transforming said normal velocity components of the axisymmetric vibratory movement of the stator into rotary movement of the rotor.

2. A piezo-electric motor according to claim 1, wherein the resiliently deformable members are fixed to the rotor.

3. A piezo-electric motor according to claim 1, wherein the resiliently deformable members comprise deflectable tongues.

4. A piezo-electric motor according to claim 1, wherein the resiliently deformable members project between the stator and a peripheral portion of the rotor at an angle of inclination relative to an axis parallel to said axis of rotation.

5. A piezo-electric motor according to claim 4, wherein said angle of inclination is between 10° and 30°.

6. A piezo-electric motor according to claim 3, wherein said tongues are disposed on a disc formed of the same material as the tongues, said disc being mounted on the rotor.

7. A piezo-electric motor according to claim 6, wherein said disc is made of metal and said tongues are formed on said metal disc by a cold forming process, such as a cold drawing process.

8. A piezo-electric motor according to claim 2, wherein the resiliently deformable members project between the stator and a peripheral portion of the rotor at an angle of inclination relative to an axis parallel to said axis of rotation.

9. A piezo-electric motor according to claim 8, wherein said angle of inclination is between 10° and 30°.

10. A piezo-electric motor according to claim 2, wherein said deformable members comprise projections from a peripheral portion of the rotor in the direction of the stator at an angle of inclination relative to an axis parallel to said axis of rotation.

11. A piezo-electric motor according to claim 10, wherein said angle of inclination is between 10° and 30°.

12. A piezo-electric motor according to claim 3, wherein said deformable members comprise projections from a peripheral portion of the rotor in the direction of the stator at an angle of inclination relative to an axis parallel to said axis of rotation.

13. A piezo-electric motor according to claim 12, wherein said angle of inclination is between 10° and 30°.

14. A piezo-electric motor according to claim 3, wherein the deflectable tongues are fixedly secured to the rotor and rest in abutment on the stator.

15. A piezo-electric motor according to claim 14, wherein the deflectable tongues project between the stator and a peripheral portion of the rotor at an angle of inclination relative to an axis parallel to said axis of rotation.

16. A piezo-electric motor according to claim 15, wherein said angle of inclination is between 10° and 30°.

* * * * *